(12) United States Patent
Frantzen et al.

(10) Patent No.: US 8,020,208 B2
(45) Date of Patent: Sep. 13, 2011

(54) INTRUSION MANAGEMENT SYSTEM AND METHOD FOR PROVIDING DYNAMICALLY SCALED CONFIDENCE LEVEL OF ATTACK DETECTION

(75) Inventors: Michael T. Frantzen, Arlington, VA (US); Andre Yee, Herndon, VA (US)

(73) Assignee: NFR Security Inc., Rockville, MD (US)

( * ) Notice: Subject to any disclaimer, the term of this patent is extended or adjusted under 35 U.S.C. 154(b) by 1382 days.

(21) Appl. No.: 11/178,585

(22) Filed: Jul. 12, 2005

(65) Prior Publication Data

US 2006/0037078 A1 Feb. 16, 2006

Related U.S. Application Data

(60) Provisional application No. 60/586,875, filed on Jul. 12, 2004.

(51) Int. Cl.
*G06F 21/00* (2006.01)
*G08B 23/00* (2006.01)

(52) U.S. Cl. ............... 726/23; 726/11; 726/25; 713/154

(58) Field of Classification Search ........................ None
See application file for complete search history.

(56) References Cited

U.S. PATENT DOCUMENTS

| | | | |
|---|---|---|---|
| 6,499,107 B1 * | 12/2002 | Gleichauf et al. | 726/23 |
| 6,839,850 B1 * | 1/2005 | Campbell et al. | 726/23 |
| 7,278,160 B2 * | 10/2007 | Black et al. | 726/23 |
| 2002/0032871 A1 * | 3/2002 | Malan et al. | 713/201 |
| 2003/0172292 A1 * | 9/2003 | Judge | 713/200 |
| 2003/0188189 A1 * | 10/2003 | Desai et al. | 713/201 |
| 2003/0200462 A1 | 10/2003 | Munson | |
| 2003/0236652 A1 * | 12/2003 | Scherrer et al. | 703/2 |
| 2003/0236995 A1 * | 12/2003 | Fretwell, Jr. | 713/200 |
| 2004/0199791 A1 * | 10/2004 | Poletto et al. | 713/201 |
| 2004/0250134 A1 * | 12/2004 | Kohler et al. | 713/201 |
| 2005/0262565 A1 * | 11/2005 | Gassoway | 726/23 |
| 2006/0230456 A1 * | 10/2006 | Nagabhushan et al. | 726/25 |

* cited by examiner

*Primary Examiner* — Eleni Shiferaw
*Assistant Examiner* — Jeffery Williams
(74) *Attorney, Agent, or Firm* — Blank Rome LLP

(57) ABSTRACT

An Intrusion Management System detects computer attacks and automatically adjusts confidence that an attack was correctly detected. When the Intrusion Management System detects the attack against a computer system, it does not represent an accuracy of detection as an immutable confidence value. Instead, the Intrusion Management System tabulates information indirectly related to the attack and dynamically scales the confidence in the attack detection accordingly.

14 Claims, 2 Drawing Sheets

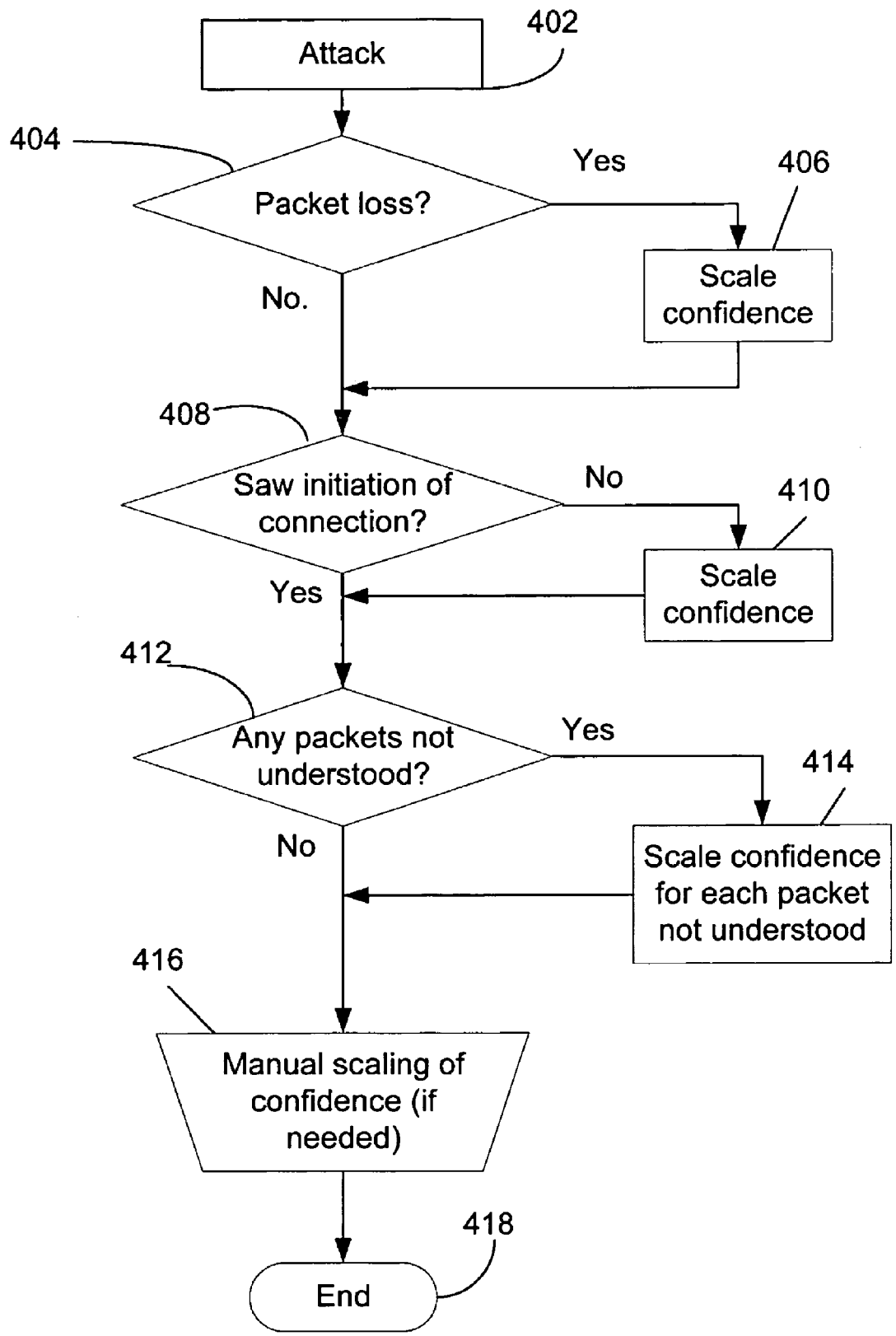

INTRUSION MANAGEMENT SYSTEM AND METHOD FOR PROVIDING DYNAMICALLY SCALED CONFIDENCE LEVEL OF ATTACK DETECTION

REFERENCE TO RELATED APPLICATION

The present application claims the benefit of U.S. Provisional Patent Application No. 60/586,875, filed Jul. 12, 2004, whose disclosure is hereby incorporated by reference in its entirety into the present disclosure.

FIELD OF THE INVENTION

The present invention is directed to an intrusion management system for detecting attacks against a computer system or network and more particularly to such a system in which detection confidence is dynamically scaled to reduce false positives.

DESCRIPTION OF RELATED ART

The job of an Intrusion Management System is to detect attacks against computer systems or computer networks. Once an attack is detected, the Intrusion Management System is responsible for presenting forensic information about the attack to a human examiner. Furthermore, the Intrusion Management System (abbreviated to "IMS" from here forward) can also be responsible for preventing attacks from succeeding.

Traditionally, as shown in FIG. 1, communication between the Internet 102 and an internal network 106 passes through an IMS 104. From the standpoint of computer security, the diagram appears as shown in FIG. 2, in which an attacker 202 mounts an attack against the internal network 106 through the Internet 102 and the IMS 104.

The most common complaint against systems that detect computer attacks is that they all too often identify perfectly legitimate behavior as an attack. To the practitioners of the art, these incorrect detections are known as "false positives." After detecting an attack (incorrect or otherwise), a human examiner has to expend time and resources to identify what damage was done by the attack and then to reverse the damage. The effect of false positives on the human examiner is that he cannot distinguish between a false positive and a true attack until he has wasted time and resources hunting for the effects of what never happened. Indeed, in some early generation attack detection systems, the number of false positives outweighed true attacks, sometimes significantly. Many early adopters of the technology abandoned it altogether after the "Cry Wolf" syndrome—investigating a large number of reported attacks that all turned out to be false positives.

The latest generations of attack detection systems not only detect, but also prevent attacks. The method behind the prevention is that the system operates similarly to a firewall in that it can check each packet on the network for attacks and then discard those packets which contain attacks. Here false positives have an affect noticeable not only to the bedraggled human examiner, but also to the people using the computer systems or the network. Imagine a situation where the web page at www.ESPN.com or www.FORTUNE.com was consistently and falsely detected as bearing an attack against web browsers. People on their lunch break not able to check the latest sports scores or an executive not able to read her financial articles have a tendency to get rather irate, after which the attack prevention systems will typically get ripped out in a hurry.

There is no panacea to the problem of false positives when detecting computer attacks. But there exists a solution to mitigate the problem by representing each detected attack with a confidence value. The confidence is an indication by the IMS of how accurately it believes it detected a particular attack, or how unlikely is it to be a false positive.

The first and most intuitive use of a confidence value attached to each attack is for the human examiner. When researching the validity and the affects of each attack detected by the IMS, the researcher can prioritize his time by looking at the attacks of the highest confidence first, since they are less likely to be a time wasting false positive. The human examiner can also apply an arbitrary threshold. For example, if he finds that most of the false positives he has investigated have had a confidence below 66%, he can just ignore anything below that threshold when his time is at a premium.

The second and more powerful use of a confidence value is for the Intrusion Management System to make automated decisions based upon it. The first such action would be the already listed application of a threshold to the reporting of attacks. If the examiner decides it is not worth his time and resources to research attacks below a certain confidence, then the IMS can automatically hide the reports of those low confidence attacks.

As previously stated, the IMS is also capable of blocking attacks before they can reach their intended victim, but false positives risk blocking legitimate traffic. In this situation, the examiner can again apply a threshold. For example, he can choose to investigate the reports of any attacks of 66% confidence or higher, and he can configure the IMS to block automatically any attacks of which it is more than 90% confident. The immediate benefit here is that most attacks will be thwarted before they can reach their intended victim, and the risk of wrongly blocking legitimate traffic is mitigated.

The IMS will also record a wealth of forensic information correlated to detected attacks. This information can be extremely useful to the human examiner analyzing the specifics of an attack. Unfortunately this wealth of recorded information can easily overwhelm the database storing all of the forensics. This is especially true when many IMS systems are all recording their forensics to a single database. In such a situation, the human examiner can reduce the load on an overloaded database by configuring the IMS to record only the auxiliary forensic information for those attacks with a high enough confidence that the examiner will research.

However, the IMS has no way of dynamically scaling the confidence level from the circumstances of the attack. Thus, the usefulness of the confidence assignment is severely limited.

SUMMARY OF THE INVENTION

It is thus an object of the present invention to provide a technique for dynamically scaling the confidence in an attack based on the circumstances of the attack.

To achieve the above and other objects, the present invention is based on the realization, reached after a study of many gigabytes of traffic, that several common factors contribute to the incidence of false positives. Those common factors are perfect scalars for a dynamic confidence in the accuracy of a detected attack. Those scalars are packet loss, whether the IMS has seen the communication from its inception, and the number of times the IMS did not understand part of the communication and was forced to resynchronize.

Therefore, the present invention is directed to a system and method for observing at least one of those scalars and for dynamically adjusting the confidence level in accordance with the observed scalar. Preferably, all three scalars are observed, and the confidence is scaled in accordance with the results of all three.

BRIEF DESCRIPTION OF THE DRAWINGS

A preferred embodiment of the present invention will be set forth in detail with reference to the drawings, in which:

FIG. 4 is a flow chart showing the operation of the intrusion management system of FIG. 3.

DETAILED DESCRIPTION OF THE PREFERRED EMBODIMENT

Figure 1:
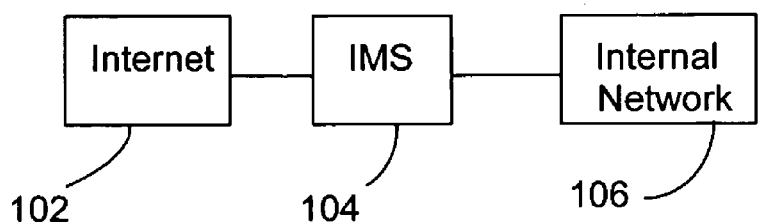
FIG. 1 is a block diagram showing a configuration of an intrusion management system between the Internet and an internal network according to the prior art.
Figure 2:
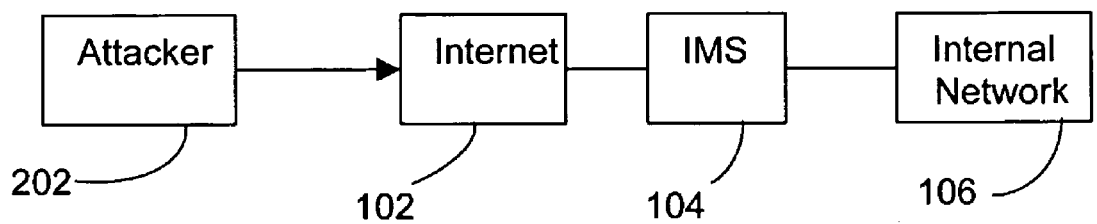
FIG. 2 is a block diagram showing the same configuration as shown in FIG. 1, except from the standpoint of defending the internal network from an external attacker.

A preferred embodiment of the present invention will be set forth in detail with reference to the drawings, in which like reference numerals refer to like elements or operational steps throughout.

Figure 3:
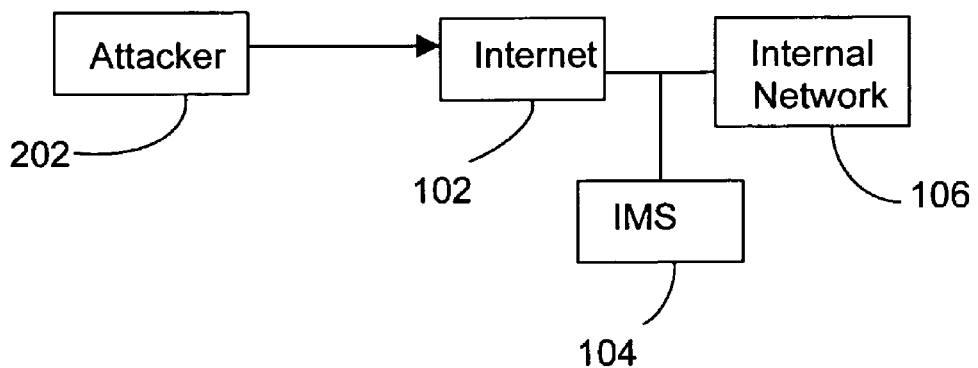
FIG. 3 is a block diagram showing a configuration of an intrusion management system according to the preferred embodiment.

The first scalar is the presence of packet loss. In a passive configuration, shown in FIG. 3, the IMS 104 hangs off of a network and watches packets as they go by (packets do not go directly through this IMS).

Since the packets do not go directly through the IMS, the IMS might miss a packet while it is doing something else. After missing a packet, the IMS will have a gap in the communication it is monitoring. When such a gap occurs, one option is to ignore the lossy communications. However, ignoring such communications is not acceptable in the security marketplace.

Such gaps in the IMS's view of the communication lead to false positives. One prevalent example is in the detection of an attack against the Microsoft IIS (Internet Information Server) web server. Each HTTP 1.1 request to the web server must contain a "Host" modifier which tells the web server which web site is being browsed. Some versions of the Microsoft IIS web server can be attacked by sending a hostile payload in multiple "Host" modifiers. A normal HTTP 1.1 web request might look like:

GET/mlb/scoreboard HTTP/1.1
Host: sports.espn.go.com

In cases, there will be other modifiers between the GET and the Host such that they will be put in different packets.

- - -
|GET/mlb/scoreboard HTTP/1.1
| . . . other modifiers . . .
- - -
- - -
| . . . more modifiers . . .
|Host: sports.espn.go.com
- - -

Now suppose that a web browser makes two requests of the web server that are split across four packets

- - -
|GET/mlb/scoreboard HTTP/1.1
| . . . other modifiers . . .
- - -
- - -
| . . . more modifiers . . .
|Host: sports.espn.go.com
- - -
- - -
|GET/mlb/clubhouse?team=bal HTTP/1.1
| . . . other modifiers . . .
- - -
- - -
| . . . more modifiers . . .
|Host: sports.espn.go.com
- - -

Now further suppose that the third packet is lost; the first part of the request for the Orioles-specific scores. The passive IMS will see the first request with its Host modifier, but then associate the fourth packet's host modifier with the first request. Ergo, the one lost packet leads the IMS to think the server is being attacked via multiple Host modifiers.

In the preferred embodiment, the mechanism for coping with this is to scale the confidence negatively in the attack when a lost packet leaves a gap in the IMS' view of the communication.

The second scalar is a sibling of the first scalar and checks whether the IMS has seen the communication from its inception. A common phenomenon is for communication to begin before the IMS can begin monitoring the traffic; the resulting problem is called the cold-start problem. For example, if one were to email a colleague about the latest email worm attacking the internet as a whole, and the IMS started monitoring the email in the middle of its being sent, the IMS could confuse the discussion for the actual attack. To deal with this cold-start issue, the IMS will negatively scale the confidence in any detected attacks if it did not observe the origination of the connection.

In the case of TCP (Transmission Control Protocol), communication must begin with a three way handshake between the two participants before any information can be exchanged on the connection.

Client→(Synchronize packet)←Server
Client→(Acknowledge Synchronize packet)←Server
Client→(Acknowledge packet)←Server Thus, the IMS will always know if it has observed the origination of communication carried on the TCP protocol. Fortunately, a majority of the computer network traffic is carried over TCP.

The third confidence scalar is the number of times the IMS did not understand part of the communication and was forced to resynchronize. One of the underlying tenets of the Internet is to be strict about what you send and permissive about what you accept. As a result, network services (like web servers or email servers) will tolerate very large variations in the format of communication. An analogy would be talking to a clerk at the supermarket in English and slipping a few words of Latin into the conversation. In the Internet context, the clerk would just ignore the Latin he didn't understand instead of getting confused. The IMS has a much harder time dealing with things it does not understand, since it does not know a priori if the listener really speaks Latin or how he will react to it.

To deal with snippets of communication it does not understand, the IMS will attempt to resynchronize immediately afterwards. The resynchronization involves looking at how the hosts respond to the unknown communication and what they say next. Unfortunately, the resynchronization is not always accurate, so we must negatively scale the confidence of any attacks detected after we resynchronized.

The last mechanism used by the IMS to scale the attack confidence is a manual method driven by the examiner. If the IMS reports an attack to the examiner, and he feels that his particular environment dictates a change to the confidence, he can manually cause it to be scaled. His scaling factor will automatically apply to any future attacks like the one he manually scaled. For instance, the examiner could increase the confidence of any WWW attacks if his network policy were draconian and did not allow any employees to browse the web during work hours.

The technique described above will now be summarized with reference to the flow chart of FIG. 4. In step 402, an attack, real or putative, is detected and assigned an initial confidence. In step 404, it is determined whether there has been any packet loss. If so, the confidence is scaled in step 406. If not, or once the confidence has been scaled, it is determined in step 408 whether the IMS saw the initiation of the connection. If not, the confidence is scaled again in step 410. Then, or if the IMS saw the initiation of the connection, it is determined in step 412 whether there have been any packets containing information which the IMS did not understand. If so, the confidence is scaled for each such packet in step 414. Then, or if all information was understood, the examiner may apply a manual scaling of the confidence in step 416. The process ends in step 418 with a confidence scaled in accordance with the above-noted three scalars and any manual scaling applied by the examiner.

Each attack known by the IMS is assigned a base confidence value which corresponds to an attack detected under optimal conditions. From there, the confidence is dynamically and automatically adjusted based on the above scaling factors.

In the below examples, we refer back to the multiple Host modifier attack against Microsoft IIS web server version 4.0.

---

|GET/mlb/scoreboard HTTP/1.1
|Host: sports.espn.go.com
|Host: <attack payload>

---

The IMS will prepare an alert about the attack with a base confidence of 90%. Since the attack was detected under optimal conditions, the confidence will be reported as 90%

---

|GET/mlb/scoreboard HTTP/1.1
| . . . more modifiers . . .

---
---

| . . . more modifiers . . .
|Host: sports.espn.go.com

---

*lost packets*

---

| . . . more modifiers . . .
|Host: sports.espn.go.com

---

Now in the above example, the IMS will incorrectly detect an attack. Since there was packet loss, the confidence will be scaled down from 90% to 67% before being reported to the examiner.

*did not see the start of the communication*

---

|GET/mlb/scoreboard HTTP/1.1
| . . . more modifiers . . .

---
---

| . . . more modifiers . . .
|Host: sports.espn.go.com

---

*lost packets*

---

| . . . more modifiers . . .
|Host: sports.espn.go.com

---

Now in the above example, the IMS will again incorrectly detect an attack. Since there was packet loss and the IMS did not see the origination of the communication, the confidence will be scaled twice down from 90% to 50% before being reported to the examiner. Likewise, it could have been scaled a third time down to 37% if the web request contained junk the IMS did not understand and it was forced to resync.

Specific examples of code and numerical scaling will now be set forth.

The first scalar (presence of packet loss on a connection, FIG. 4, step 404) can be checked with a single variable in the following manner:

if (tcp.connForwLost>0) {
$confidence=$confidence*75%
}

The IMS engine provides the "tcp.connForwLost" variable to facilitate easy access to the number of bytes it lost from the client destined to the server over the course of the connection. Likewise, the "tcp.connBackLost" variable is the number of bytes from the server to the client. Since the preferred embodiment is concerned primarily with attacks from clients against servers, the preferred embodiment does not check for lost packets in the other direction.

The second scalar (whether the IMS has seen communication the since inception, FIG. 4, step 408) can also be checked with a single variable in the following manner:

if (!tcp.connSyn) {
$resync_count=$resync_count−1;
$confidence=$confidence*75%
}

As is known in the art, TCP (Transmission Control protocol) must begin with a three-way handshake. The above "tcp.connSyn" variable indicates whether the IMS saw the synchronize packet. If the IMS did not see the initiation of the connection, the second scalar will affect the third scalar (how many times the IMS did not understand the connection and tried to resynchronize). It is not desirable to scale a confidence twice for a single event. If the IMS misses the initiation of a connection, there is a very high probability that it also immediately had to resynchronize to the connection.

The third scalar (the number of times the IMS did not understand the connection and tried to resynchronize, FIG. 4, step 412) is an iterative scalar. It will scale the confidence once for every resynchronization, in the following manner:

while ($resynccount>0) {
$resync_count=$resynccount−1
$confidence=$confidence*75%
}

The confidence is scaled once for each and every time the IMS did not understand the connection. The IMS is unable to differentiate between two misunderstandings contiguous to each other and thus treats them as a single gap in the communication stream for purposes of confidence scaling. For example, if the IMS did not understand two parts of the communication, the confidence is scaled twice. Not all attack detection algorithms keep a count of how often they did not understand a connection. When the algorithm does not have such a count, steps 412 and 414 can be skipped. When the algorithm does have that count, the first scalar can be ignored, and the third scalar can be considered to be a superset of the first; that is, steps 404 and 406 can be skipped.

In the preferred embodiment, the confidence is adjusted by 25% for each scaling factor which occurs on a connection. The 25% number is chosen fairly arbitrarily; those skilled in the art who have reviewed the present disclosure will be able to choose other scaling factors. Because of the ambiguous nature of detecting attacks, most detections are only 90% confident even under ideal circumstances A single scaling factor decreases the confidence enough that a human would intuitively question those scaled attacks. A confidence level of 90% scaled by 25% (90*0.75) is 67%, which has the right "feeling" about it. If the original confidence is 90%, the scaled confidences are as given in Table I below:

TABLE I

Scaled confidences

| Number of scalars | Resulting confidence |
|---|---|
| 0 | 90% |
| 1 | 67% |
| 2 | 50% |
| 3 | 37% |
| 4 | 28% |
| 5 | 21% |
| 6 | 16% |
| 7 | 12% |
| 8 | 9% |
| 9 | 6% |
| 10 | 5% |

The preferred embodiment does not continuously scale the confidence as factors occur. Instead, it calculates the scaled confidence only after it has detected a probable attack. That is for two reasons. Since attacks are very infrequent in comparison to the mass volume of network traffic, it is more performance-efficient to do the calculation only when needed. Secondly, it makes for more centralized code to have the confidence scaling in one place that is common to all attack alerting than spread over all of the attack detection code.

While a preferred embodiment has been set forth in detail above, those skilled in the art will readily appreciate that other embodiments can be realized within the scope of the invention. For example, numerical values are illustrative rather than limiting, as is the order in which steps are carried out. Moreover, one or two of the above-noted scalars can be used; similarly, any or all of the above-noted scalars can be used in combination with other scalars. Therefore, the present invention should be construed as limited only by the appended claims.

What is claimed is:

1. A method for dynamically scaling a confidence level of a detected attack on a computer system, the detected attack being detected by an intrusion management system in a communication with the computer system, the method comprising:
   (a) assigning an initial confidence level to the detected attack;
   (b) detecting, in the communication, at least one scalar selected from the group consisting of (i) a first scalar indicating packet loss in the communication, (ii) a second scalar indicating whether the intrusion management system has observed the communication from a beginning of the communication, and (iii) a third scalar indicating whether the communication includes any information not understood by the intrusion management system; and
   (c) scaling the initial confidence level in accordance with the at least one scalar detected in step (b) to provide a scaled confidence level.

2. The method of claim 1, wherein step (c) comprises scaling the initial confidence level further in accordance with a manual input.

3. The method of claim 1, wherein:
   step (b) comprises detecting at least two of said scalars selected from said group; and
   step (c) comprises scaling the initial confidence level in accordance with said at least two scalars.

4. The method of claim 3, wherein:
   step (b) comprises detecting all three of said scalars selected from said group; and
   step (c) comprises scaling the initial confidence level in accordance with said all three scalars.

5. The method of claim 3, wherein said at least two scalars comprise said third scalar.

6. The method of claim 5, wherein:
   said third scalar comprises a number of times the intrusion management system does not understand the information in the communication; and
   step (c) comprises scaling the initial confidence level in accordance with said number of times.

7. The method of claim 1, wherein said detected attack is received from the Internet.

8. The method of claim 1, wherein the intrusion management system is connected in a passive configuration to the computer system, such that the communication does not pass through the intrusion management system.

9. An intrusion management system for dynamically scaling a confidence level of a detected attack on a computer system, the detected attack being detected by the intrusion management system in a communication with the computer system, the intrusion management system comprising:
   a connection to the computer system to monitor the communication; and
   a processor for:
   (a) assigning an initial confidence level to the detected attack;
   (b) detecting, in the communication, at least one scalar selected from the group consisting of (i) a first scalar indicating packet loss in the communication, (ii) a second scalar indicating whether the intrusion management system has observed the communication from a beginning of the communication, and (iii) a third scalar indicating whether the communication includes any information not understood by the intrusion management system; and
   (c) scaling the initial confidence level in accordance with the at least one scalar detected in step (b) to provide a scaled confidence level.

10. The intrusion management system of claim 9, wherein the processor performs step (c) by scaling the initial confidence level further in accordance with a manual input.

11. The intrusion management system of claim 9, wherein:
   the processor performs step (b) by detecting at least two of said scalars selected from said group; and
   the processor performs step (c) by scaling the initial confidence level in accordance with said at least two scalars.

12. The intrusion management system of claim 11, wherein:
   the processor performs step (b) by detecting all three of said scalars selected from said group; and
   the processor performs step (c) by scaling the initial confidence level in accordance with said all three scalars.

13. The intrusion management system of claim 11, wherein said at least two scalars comprise said third scalar.

14. The intrusion management system of claim 13, wherein:
   said third scalar comprises a number of times the intrusion management system does not understand the information in the communication; and
   the processor performs step (c) by scaling the initial confidence level in accordance with said number of times.

* * * * *